March 26, 1968  K. MIYASHITA  3,375,372

PHOTO-STIMULATED RADIATION DOSIMETRY

Filed March 28, 1966 2 Sheets-Sheet 1

Sequence of operations and response for photo-stimulated Radiation Dosimetry
(a) With non-blocking electrodes
(b) With blocking electrodes

INVENTOR.
KAZUO MIYASHITA

Current Response of ZnS Crystals as a Function of UV Dosage
(Blocking electrodes)

Decay of the Pre-polarization for Applied Voltages Between 100 and 1000 V (Blocking electrodes)

United States Patent Office 3,375,372
Patented Mar. 26, 1968

3,375,372
PHOTO-STIMULATED RADIATION DOSIMETRY
Kazuo Miyashita, State College, Pa., assignor to the United States of America as represented by the United States Atomic Energy Commission
Filed Mar. 28, 1966, Ser. No. 538,917
4 Claims. (Cl. 250—83.3)

The invention described herein was made in the course of, or under, a contract with the U.S. Atomic Energy Commission.

This invention relates to a method for measuring radiation dosage. More particularly, this invention relates to a method for photo-stimulated radiation dosage measurement of ionizing radiation.

In crystalline radiation dosimeters, the crystals contain structural imperfections of various sorts such as missing atoms or ions, atoms or ions at inter-lattice positions, regions or misregistry of the planes of the crystal lattice, chemical impurities, and various aggregates of these primary defects. Some of these imperfections constitute regions of localized positive or negative charge which are able to attract and bind charges of the opposite polarity. Such imperfections are therefore called "traps." The strength of the binding depends upon the nature of the imperfection and determines the trap depth, i.e. the energy needed to release the trapped electron or hole.

In many processes of phosphor radiation dosimetry such as thermoluminescence or radiophotoluminescence, electrons in the valence band are excited by high energy radiation and trapped. When testing the dosimeter subsequently, the trapped electrons are externally stimulated so as to release them from their traps. They are then able to return to their original state, which results in luminescence. The total light output is then measured for a reading of the radiation dose monitored by the dosimeter.

Another known phosphor dosimetry procedure utilizes direct electrical readout. The electrical characteristics of the detector are monitored during the actual radiation event since the electrical characteristics, such as capacitance or resistance, are immediately affected by the radiation.

It is an object of this invention to provide a method for measuring the radiation dosage received by a crystal dosimeter by subsequent measurement of an electric current transient induced in the crystal itself.

It is a further object of this invention to provide a method for measuring the radiation dosage received by a crystal dosimeter having long term storage capabilities by measuring an electric current induced in the crystal itself.

Various other objects and advantages will appear from the following discussion of one embodiment of the invention, and the most novel features will be particularly pointed out hereinafter in connection with the appended claims.

This invention comprises a method for measuring ionizing radiation dosage by preconditioning a radiation sensitive crystal having a wide band gap, deep carrier traps, and high charge carrier mobility, exposing the crystal to ionizing radiation and subsequently, stimulating the crystal by infrared light in the presence of an electric field and measuring the resulting electric current transient. The crystal is preconditioned by following the same procedure for zero radiation dosage.

The present invention is described in the accompanying drawings wherein.

Figure 1:
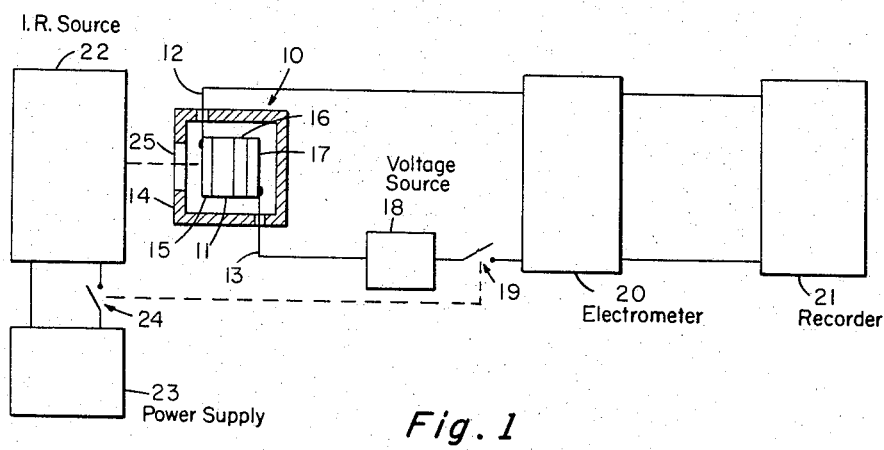
FIG. 1 is a block diagram of a crystal dosimeter and the associated apparatus needed to operate this crystal in accordance with the invention.

Radiation dosimeter 10, illustrated in FIG. 1, comprises a crystal 11 having electrical terminals 12 and 13 coupled to opposite sides thereof enclosed within an evacuated envelope 14 which can be filled with a dry inert gas. Crystal 11 can be a material such as zinc sulfide, strontium sulfide, or diamond. For optimum operation at room temperature, it is preferred that the crystal have a wide band gap greater than about 3 electron volts, deep carrier traps in which electrons are stable at room temperatures and high charge carrier mobility greater than about 10 sq. cm./volt sec.

Terminal 12 is coupled to crystal 11 by a layer of conducting glass 15 and terminal 13 is coupled to crystal 11 across insulator 16 by metal electrode 17. It is understood that terminals 12 and 13 can be coupled to crystal 11 through either blocking or nonblocking electrodes. By nonblocking electrodes is meant direct coupling of the terminals through a conductive medium to crystal 11 and by blocking electrodes is meant the capacitive coupling of the terminals to crystal 11 across an insulating medium.

An electrometer 20 is connected in series with crystal 11 through terminal 13, voltage source 18, switch 19 and terminal 12. Recorder 21 is coupled to the output of electrometer 20 to record the voltage transient monitored by electrometer 20. An infrared radiation source 22, having a power supply 23 and switch 24 coupled to voltage source 18 and switch 19, is positioned so as to direct a beam of infrared light onto crystal 11 through an infrared transparent window 25 in envelope 14 and electrode 15.

Figure 2:
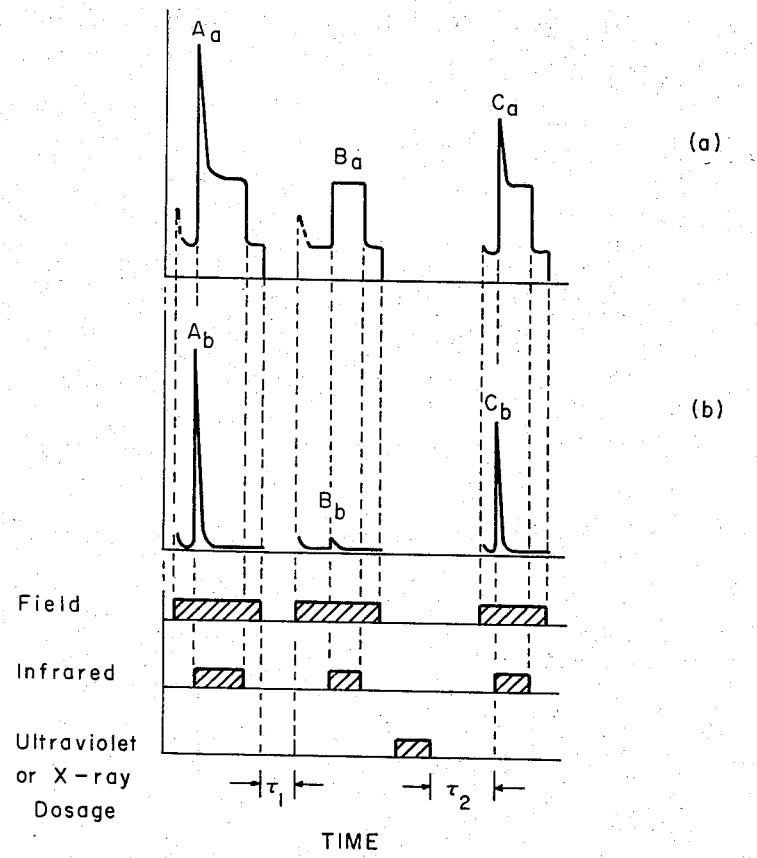
FIG. 2 is a diagram illustrating the time sequence of operations and response for a radiation crystal dosimeter operated in accordance with this invention.

In operation, switches 19 and 24 are closed and then reopened in the sequence shown on FIG. 2 whereby crystal 11 is subjected to infrared radiation of the presence of an electric field. Radiation dosimeter 10 is then subjected to an exposure dose of ionizing radiation, such as ultraviolet or X-ray radiation. After dosimeter 10 has been removed from the radiation, switch 19 is again closed and the beam of infrared light from source 22 subsequently applied to the crystal. Within useful operational limits, the transient current pulse measured by electrometer 20 and recorded by recorder 21 is directly proportional to the dose received by dosimeter 10.

FIG. 2 illustrates the sequence of operations for both a non-blocking and blocking contact type dosimeter. As shown in FIG. 2, when an electric field and infrared light beam are applied to the crystal, a polarization transient current pulse is generated and monitored by electrometer 20. If this procedure is repeated after a period $T_1$, only a very minor current pulse results. After preconditioning of dosimeter 10, and in the absence of the electric field and infrared light, the dosimeter is subjected to an ionizing radiation dosage. After the dosimeter has been removed from the radiation, it is again subjected, after a period $T_2$, to the electric field and infrared light in the sequence shown. At this time a current pulse is measured by electrometer 20 which is proportional to the dosage. The current pulse results from the photo-stimulation and release of electrons which had been energized from the valence band to the conduction band by the radiation and then trapped. This process is almost independent of the electrodes and a reversal of polarity does not affect it. As can be seen from FIG. 2, the blocking contacts inhibit the lasting photocurrent, thus improving the effective signal-to-noise ratio.

Figure 3:
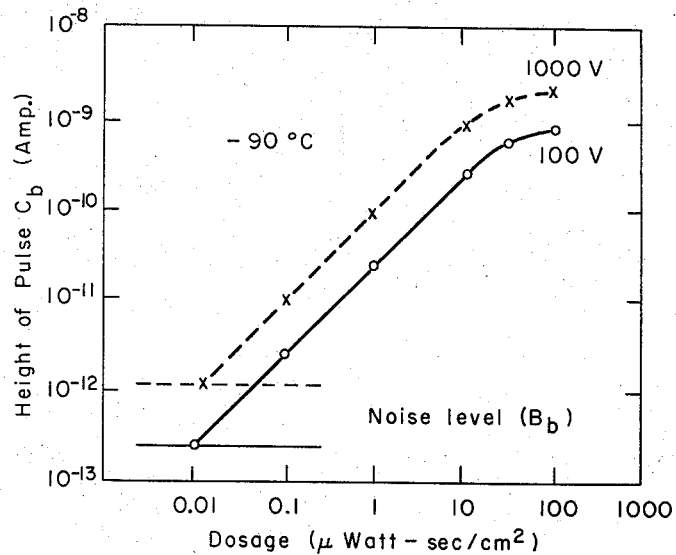
FIG. 3 is a graph of current response of a copper activated zinc sulfide crystal as a function of ultra-violet dosage which was operated in accordance with this invention.

An activated zinc sulfide crystal, formed as a polished platelet about .4 cm. on a side and .05 cm. thick and with blocking electrodes, was subjected to various ultraviolet radiation dosages over a wide range at a crystal temperature of −90° C. Measurements and preconditioning were made with an electric field of 1000 volts and 100 volts. As can be seen from FIG. 3, the dosimeter was linear down to an ultraviolet dosage as small as .01 microwatt second/sq. cm. In addition, measurements were possible at an exposure of a few milliroentgens when irradiated by 50 kv. X-rays. Further measurements indicate a potential dose measurement in the several hundred microroentgen range. Higher applied fields which tend to lower the level of detectable radiation are limited only by noise and instability. Further, high intensity photostimulants increase sensitivity but eventually lead to transient current responses too rapid to be detected.

Figure 4:
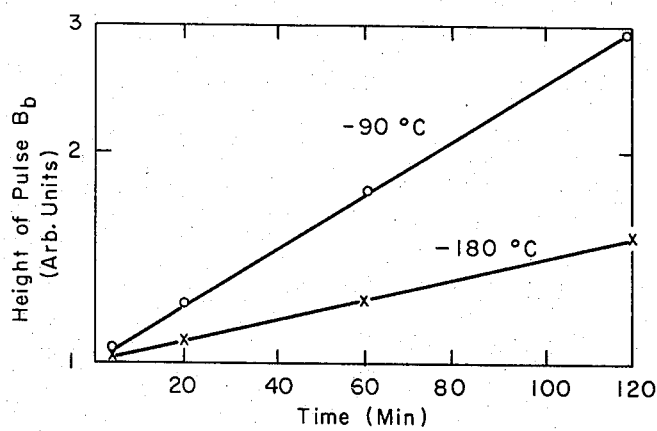
FIG. 4 is a graph of the decay of preconditioning of a copper activated zinc sulfide crystal over a period of time.

FIG. 4 illustrates the decay of preconditioning of the above zinc sulfide crystal indicated by an increase in the height of a pulse resulting from the application of the electric field and infrared light before being subjected to any radiation. As illustrated, the rate increases are smaller at lower temperatures.

This invention can also be utilized to determine crystal purity, such as the purity of commercial or natural diamonds. With a particular electric field, infrared radiation at a particular wave length and intensity and ionizing radiation at a particular energy and intensity, the resulting transient current measurement is a direct indication of the quanity and energetic position of traps. From this conclusions can be drawn concerning the impurities and defects in the crystal.

It will be understood that various changes in details, materials and arrangements of parts, which have been herein described and illustrated in order to explain the nature of the invention, can be made by those skilled in the art within the principles and scope of the invention as expressed in the appended claims.

What is claimed is:

1. A method for measuring ionizing radiation dosage, comprising:
    (a) applying an electric field and infrared light to a radiation sensitive crystal having a wide band gap, deep carrier traps and high charge carrier mobility;
    (b) exposing said crystal to ionizing radiation in the absence of said electric field and said infrared light;
    (c) applying an electric field and infrared light to said crystal; and
    (d) measuring the amplitude of the resulting current transient.

2. The method of claim 1 in which the radiation sensitive crystal has a band gap greater than 3 electron volts.

3. The method of claim 1 in which the radiation sensitive crystal has a charge carrier mobility greater than 10 sq. cm./volt sec.

4. The method of claim 1 in which the radiation sensitive crystal is taken from the group consisting of copper activated zinc sulfide, strontium sulfide and diamond.

No references cited.

RALPH G. NILSON, *Primary Examiner.*

A. B. CROFT, *Assistant Examiner.*